(12) United States Patent
Kopetz

(10) Patent No.: US 9,860,191 B2
(45) Date of Patent: Jan. 2, 2018

(54) METHOD FOR CONSTRUCTING OPTIMAL TIME-CONTROLLED PATHS IN A LARGE COMPUTER NETWORK

(71) Applicant: FTS Computertechnik GmbH, Vienna (AT)

(72) Inventor: Hermann Kopetz, Baden (AT)

(73) Assignee: FTS Computertechnik GmbH, Vienna (AT)

( * ) Notice: Subject to any disclaimer, the term of this patent is extended or adjusted under 35 U.S.C. 154(b) by 448 days.

(21) Appl. No.: 14/410,503

(22) PCT Filed: Apr. 19, 2013

(86) PCT No.: PCT/AT2013/050094
§ 371 (c)(1),
(2) Date: Dec. 22, 2014

(87) PCT Pub. No.: WO2014/000006
PCT Pub. Date: Jan. 3, 2014

(65) Prior Publication Data
US 2015/0372942 A1 Dec. 24, 2015

(30) Foreign Application Priority Data

Jun. 25, 2012 (AT) .................. A 711/2012

(51) Int. Cl.
*H04L 12/911* (2013.01)
*G06F 9/50* (2006.01)
*H04L 12/24* (2006.01)

(52) U.S. Cl.
CPC .......... *H04L 47/783* (2013.01); *G06F 9/5072* (2013.01); *H04L 47/72* (2013.01); *G06F 2209/5014* (2013.01); *H04L 41/5096* (2013.01)

(58) Field of Classification Search
CPC ....... H04L 47/783; H04L 47/78; H04L 47/72; H04L 47/70; H04L 41/5096; H04L 41/5077
(Continued)

(56) References Cited

U.S. PATENT DOCUMENTS 6,145,008 A * 11/2000 Kopetz ................. G06F 13/387
370/476
7,839,868 B2 11/2010 Kopetz
(Continued)

FOREIGN PATENT DOCUMENTS

| AT | 506623 A1 | 10/2009 |
| AT | 512805 A1 | 11/2013 |
| WO | 0184286 A2 | 11/2001 |

OTHER PUBLICATIONS

International Preliminary International Preliminary Report on Patentability for International Application No. PCT/AT2013/050094, Report dated Dec. 31, 2014, 16 Pgs.
(Continued)

*Primary Examiner* — Kwang B Yao
*Assistant Examiner* — Syed M Bokhari
(74) *Attorney, Agent, or Firm* — KPPB LLP

(57) ABSTRACT

Embodiments of the invention relate to the dynamic creation of TT paths in a large computer network having computer nodes, communication channels, and distribution modules (DMs), which all have access to a global time base, wherein a scheduling instance, aimed at establishing a time-controlled path with specified path time characteristics from a transmitting to a receiving node along an existing virtual connection (VC), requests from each DM in the VC all the TT path descriptor lists (TTPDLs) confirmed by said DMs, then transmits the specified path time characteristics and all confirmed TTPDLs to a dynamic scheduler that creates a new TTPDL for each DM in the VC, the existing reserved
(Continued)

Figure 1:
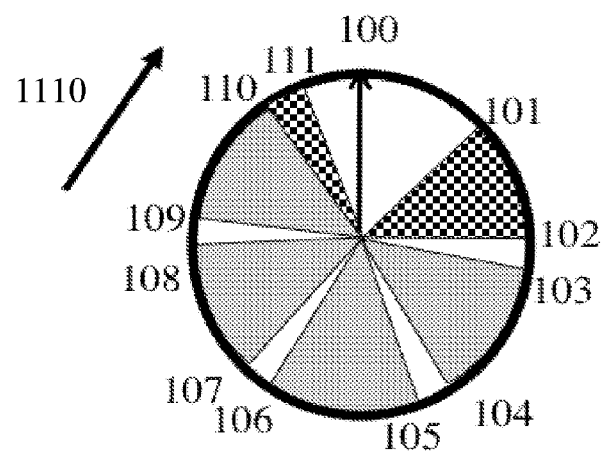

TTPDLs of the DMs affected remaining unchanged, wherein the corresponding new TTPDLs are transmitted to each DM in the VC, and wherein each DM in the VC reserves the TT path requested and confirms the reservation to the scheduling instance.

14 Claims, 1 Drawing Sheet

(58) Field of Classification Search
USPC .......................................... 370/443, 254, 498
See application file for complete search history.

(56) References Cited

U.S. PATENT DOCUMENTS

| | | | |
|---|---|---|---|
| 2006/0242252 A1 | 10/2006 | Jiang et al. | |
| 2006/0253853 A1* | 11/2006 | Jiang ..................... | G06F 9/4887 718/100 |
| 2007/0081473 A1* | 4/2007 | Jiang ...................... | H04L 12/24 370/254 |
| 2009/0086763 A1* | 4/2009 | Kopetz ............... | H04L 12/4015 370/498 |
| 2010/0220744 A1 | 9/2010 | Ungermann et al. | |
| 2010/0281130 A1* | 11/2010 | Kopetz ............. | H04L 12/40026 709/207 |
| 2011/0032833 A1 | 2/2011 | Zhang et al. | |
| 2011/0066854 A1* | 3/2011 | Poledna ............ | H04L 12/40136 713/168 |

OTHER PUBLICATIONS

International Search Report for International Application No. PCT/AT2013/050094, Search completed Jul. 19, 2013, dated Jul. 29, 2013, 3 Pgs.

Written Opinion for International Application No. PCT/AT2013/050094, Search completed Jul. 19, 2013, dated Jul. 29, 2013, 15 Pgs.

Steiner, Wilfrid, "An Evaluation of SMT-Based Schedule Synthesis for Time-Triggered Multi-hop Networks", 2010 31st IEEE Real-Time Systems Symposium, Nov. 1, 2010, XP055072111, DOI: 10.1109/RTSS.2010.25, ISBN: 978-0-76-954298-0, pp. 375-384.

Kopetz, H., "Real-Time Systems, Design Principles for Distributed Embedded Applications", Springer publishing house, 2011.

* cited by examiner

METHOD FOR CONSTRUCTING OPTIMAL TIME-CONTROLLED PATHS IN A LARGE COMPUTER NETWORK

The invention relates to a method for the dynamic creation of TT paths in a large computer network consisting of a plurality of computer nodes, distribution modules and communication channels, wherein all distribution modules have access to a global time base.

The present invention lies in the field of computer engineering. It describes an innovative method for constructing, under the given preconditions, optimal time-controlled communication paths in a large computer network, for example in the Internet, in order to transport messages with guaranteed time behaviour.

In many technical applications, current information concerning the state of a spatially distributed system is required in a central control station. For example, it is advantageous in the case of the control of the electrical distribution grid (smart grid) if the information concerning the state of the far-off sensors and actuators (often hundreds of kilometers away) is reliably available in the control station within less than a voltage period (that is to say 20 milliseconds).

The existing infrastructure, that is to say the Internet, which provides the possibility of exchanging data between connected computers, is not currently able to guarantee the short period of message transport required in this application.

The objective of the present invention is to construct time-controlled paths in large networks, said paths having guaranteed response time behaviour, such that applications such as the smart grid can communicate via the Internet.

A large computer network is generally understood to mean a network in which there is no central instance which controls the entire network. An example of a large computer network is the Internet.

The object is achieved with a method of the type mentioned in the introduction in that, in accordance with the invention, a scheduling instance, which is aimed at establishing a time-controlled path with specified path time characteristics from a transmitting computer node (SRK) to a receiving computer node along an existing virtual connection, firstly, by means of a request message, requests from each distribution module arranged in the virtual connection all the TT path descriptor lists (TTPDLs) already confirmed by said distribution modules, then transmits the specified path time characteristics and all confirmed TTPDLs to a dynamic scheduler, and wherein the dynamic scheduler creates a new TTPDL for each distribution module arranged in the virtual connection, wherein the existing reserved TTPDLs of the distribution modules affected remain unchanged, and wherein the corresponding new TTPDLs are transmitted to each distribution module arranged in the virtual connection, and wherein each distribution module arranged in the virtual connection reserves the TT path requested and confirms the successful reservation to the scheduling instance by means of a confirmation message.

In the existing Internet protocols, the construction of a virtual connection between two end systems or between the distribution modules connected to these end systems is already provided. A virtual connection establishes a path from a transmitting computer node (SRK) to one or more receiving computer nodes, wherein the path leads via a plurality of distribution modules, which are interconnected via various communication channels. In accordance with the invention, a time-controlled connection is constructed over such an existing path in such a way that a message can be transported from the SRK to the receivers with a minimal transport time.

The minimal period of the transmission of a message along a point-to-point channel is determined by the propagation delay and the bandwidth of the channel [7]. A minimal transport time of a message along a path consisting of many point-to-point channels between the distribution modules is achieved when the phases of the transmission of the message along the existing path are synchronised in such a way that there is no need for any unnecessary intermediate storage of the message in a distribution module along the path. In order to achieve this, a schedule is created in accordance with the invention for each distribution module along the path a priori and enables the conflict-free conveyance and forwarding of all time-controlled messages to be conveyed from this distribution module. This presupposes that all distribution modules affected have access to a global time [7]. Such a global time can be provided for example by a synchronisation via the GPS signals available over the world.

Since, in a large computer network, such as the Internet, there is no central station and no global view of the entire system state, a scalable decentralised solution is proposed with the method disclosed here. The starting point is the same as in [6], where a time-controlled path is established along a predefined virtual connection. In contrast to [6], the scheduling of the time-controlled path (of the TT path) is not performed by the distribution modules, but by a scheduler, which is provided with all information concerning the confirmed reservations of the distribution modules (switches) arranged along the path and also the parameters of the desired time-controlled path. The scheduler thus has all information necessary for finding an optimal TT path under the given marginal conditions of the existing time-controlled connections.

Neither in the patent literature [1-5] nor in the scientific literature have suggestions been found concerning the dynamic construction of a time-controlled path in a large computer network, such as the Internet.

The present invention discloses a method for constructing an optimal time-controlled channel in a large computer network, such as the Internet, along an existing virtual connection, said channel enabling the conflict-free and careful forwarding of the a priori scheduled time-controlled messages.

The invention also relates to a scheduling instance for use in an above-described method.

The scheduling instance is preferably configured as a distinguished distribution module, as a system administrator or as another selected computer node, or the function thereof is performed by the transmitting computer node, a distinguished distribution module, a system administrator or another selected computer node.

The invention additionally relates to a scheduler for use in an above-described method.

The scheduler can be provided in one embodiment of the invention together with the scheduling instance in common hardware.

The scheduler can advantageously be formed separately from the scheduling instance.

Here, it may be advantageous if the scheduler or functions thereof are provided in a cloud of the computer network. In this embodiment the functionality of the scheduler is provided by computer centres, which are addressed via the network ("cloud computing").

Lastly, the invention also relates to a computer network, in particular a large computer network, consisting of a plurality of computer nodes, distribution modules and communication channels, wherein all distribution modules have access to a global time base, for carrying out an above-described method.

Further advantageous embodiments of the invention are described as follows and can be provided additionally, alternatively or in any combination with one another. Here, it may be that
- a reservation of a TT path in a distribution module is performed for a future reservation interval with specified start point and end point;
- a reservation of a TT path in a distribution module at a given moment in time can be active or passive, wherein a switchover from the passive to the active state and vice versa is triggered by an activation message to the distribution module affected;
- following the request to a distribution module to transmit all confirmed TTPDLs to a scheduling instance, a reservation timeout is started in the distribution module, during which no further requests of this type may be handled;
- the failure of a distribution module is identified by the absence of the alive messages to be transmitted periodically by the distribution module;
- following the transient failure and restart of a distribution module during a specified reintegration interval, the distribution module does not perform a new reservation, and wherein all scheduling instances transmit, to the distribution modules affected, their confirmed active and passive reservations periodically with a period that is smaller than the reintegration interval;
- the construction of a time-controlled path is performed by the distribution module directly connected to the SRK;
- the communication between the scheduling instance and the distribution modules is secured by cryptographic methods.

The present invention will be explained in detail with reference to the following drawing. In this drawing FIG. 1 shows a cyclical illustration of the progression of real time, and FIG. 2 shows the structure of a small part of a large network and a path provided between two end systems.

FIG. 1 shows a cyclical illustration of the progression of real time. In this illustration, the progression of real time is illustrated in the form of periods and phases. In FIG. 1, the time progresses in the clockwise direction 1110. The start of a period is synchronised at the moment 100 with the global time. An event that occurs within a period (for example the event 101) is characterised by the specification of the angle, that is to say the phase, between the start of the period 100 and the event 101. If time has passed through a full period, that is to say an angle of 360 degrees, the following period thus starts. During the following period, the time-controlled actions have the same phase as in the previous period. The cyclical image of the progression of real time is particularly well suited for representing periodic processes as occur in time-controlled real-time systems.

Figure 2:
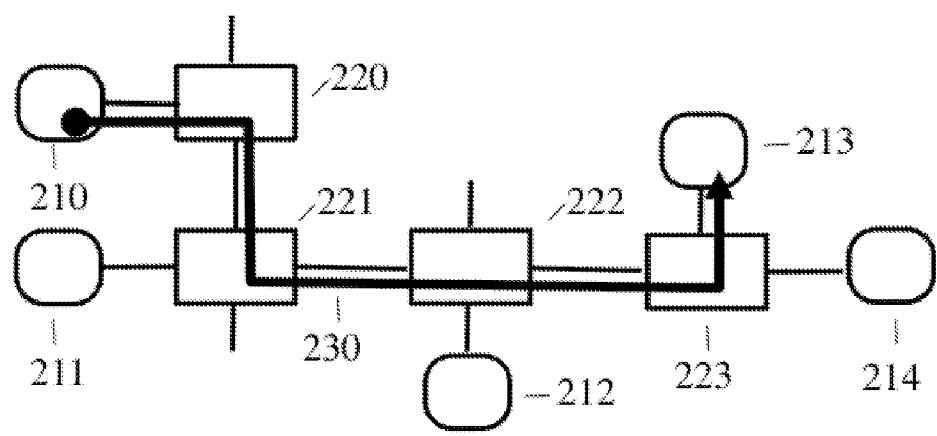

FIG. 2 shows a small part of a large computer network. In FIG. 2, the five end systems 210, 211, 212, 213, 214 and the four distribution modules 220, 221, 222, 223 are illustrated. In addition, in FIG. 2 the path 230 from the end system 210, that is to say the transmitting computer node (SRK), via the distribution modules (switches) 220, 221, 222 and 223 to the end system 213 is shown.

The course over time of a message transmission along the path 130 is illustrated in FIG. 1. At the moment 101, the end system 210, that is to say the transmitting computer node (SRK), starts to transmit a message. At the moment 102, the first bit of this message arrives at the distribution module 220. The message resides in the distribution module until the moment 103, at which the first bit of the message leaves the distribution module 220 in the direction of the distribution module 221. At the moment 104, the first bit of the message arrives at the distribution module 221. The described process is repeated until the moment 108, at which the message arrives at the distribution module 223 directly before the receiving end system 213. The transmission of the message is completed at the moment 111, that is to say the moment at which the last bit of the message has arrived at the end system 213. The interval (110, 111) is referred to as end latency.

Hereinafter, further terms used in this document will be explained. A time-controlled path between two end systems is characterised by the precise specification of the reservation interval (that is to say the interval during which the time-controlled connection is required), the phase and period at the start of the path, the phase and period at the end of the path, and the length [bit] of a time-controlled message. These parameters determine the real-time characteristics of a time-controlled path.

When the end system 210 along the virtual connection 230 intends to establish a time-controlled path for a data stream, the following method is performed.

First, a scheduling instance transmits a request message to all distribution modules arranged along the path, that is to say in FIG. 2 the distribution modules 220, 221, 222, and 223, with the request to communicate to the scheduling instance all active and passive reservations of time-controlled paths confirmed in the past for the scheduled future reservation interval. The scheduling instance can be the transmitting computer node SRK, a special distribution module, the system administrator or another selected computer node.

A reservation for a time-controlled path in a distribution module is determined in the TT path descriptor list (TTPDL). The TTPDL contains:
- a reservation interval, that is to say the interval during which the time-controlled message is to be conveyed
- moment (period, phase) of the expected arrival of the time-controlled message at the input port of the distribution module
- moment (period, phase) of the transmission of the outgoing message from the output port of the distribution module
- specification as to whether the reservation interval is active or passive.

A TTPDL is active during the reservation interval if time-controlled messages are expected in this interval. A TTPDL is passive during the reservation interval when a reservation has been made and confirmed, but no time-controlled message is currently expected. A passive TTPDL can be activated by an activation message to the affected distribution module from the scheduling instance. A passive TTPDL enables a rapid activation of a previously scheduled time-controlled path, for example in order to have available very quickly a new time-controlled connection following the occurrence of a failure of a distribution module. Provided a TTPDL is passive, the available bandwidth can be used for event-controlled messages.

The concept of passive TTPDLs can also be used to configure time-controlled channels beforehand in one or more distribution modules, such that, where necessary, these channels can be immediately activated by activation messages. The installation and expansion of time-controlled systems can thus be simplified significantly.

Following completion of the request phase, the scheduling instance contains all information concerning the confirmed reservations for time-controlled messages along the desired path. This information is transmitted, together with the specified path characteristics of the desired new time-controlled path (reservation interval, period, phase, message length) to a scheduler, which, under the given reservation conditions, calculates an optimal schedule for all distribution modules affected. Here, the scheduler may not change the confirmed reservations. The confirmed reservations thus constitute the marginal conditions for the calculation of the new schedule. In contrast to [6], the scheduler has all necessary information to be able to create an optimal schedule.

The scheduler is typically formed separately from the scheduling instance. By way of example, the scheduler runs on a hardware separate from the scheduling instance.

The scheduler, however, may also be part of the scheduling instance, for example the hardware that provides the scheduling instance or that acts as the scheduling instance also acts as the scheduler. In this case, the wording in claim 1 means that the scheduling instance "transmits the specified path time characteristics and all confirmed TTPDLs" to the scheduler and that the scheduling instance transmits these characteristics and TTPDLs to the scheduler.

Following the creation of the schedule by the scheduler and the determination of the new TTPDLS for the desired connection, the scheduler or the scheduling instance transmits these new TTPDLs to the distribution modules affected in order to fix the reservation. The distribution modules affected respond with a confirmation message in order to communicate to the scheduling instance the confirmation of the new time-controlled path.

During a previously determined reservation timeout, none of the distribution modules arranged along the desired path may positively respond to a further reservation request. The new TTPDLs must be communicated to the affected distribution modules within the reservation timeout, because the blocking of further requests is lifted once the reservation timeout has elapsed.

When a distribution module arranged along the time-controlled path fails, the scheduling instance can thus activate the passive TTPDLs already scheduled along an alternative path in order to quickly provide a new time-controlled connection.

The failure of a distribution module is identified via a membership protocol [7], which causes any distribution module involved in a time-controlled path to periodically transmit an alive message to the scheduling instance with a previously determined period or membership latency. If an alive message is absent, a failure of the distribution module is thus assumed.

From experience, a failure of a distribution module is transient in most cases, that is to say, following a reset of the distribution module, the function of the distribution module is reinstated. Since, following a reset, all TTPDLs stored in the distribution module are lost, the restart of a distribution module is assisted by the following innovative method. Directly after the restart of a failed distribution module, a reintegration timeout is started. During the reintegration timeout, the distribution module running again may not accept any new reservations. In accordance with the invention, all scheduling instances transmit in a periodic message, to all distribution modules affected, the TTPDLs affecting said scheduling instances, wherein the period is shorter than the reintegration timeout. It is thus ensured that a distribution module that is running again has restored its lost inner state following the reintegration timeout.

In a special implementation, it is possible for a distribution module directly connected to the SRK to perform the described tasks of the scheduling instance. The construction of the time-controlled connection is hereby shifted into the computer network so that the computer node connected to the network can be integrated with minimal effort into the time-controlled network.

In order to prevent an intruder from disturbing the construction of time-controlled connections, the traffic between the scheduling instance and the distribution modules can be secured by a cryptographic method corresponding to the prior art.

With the use of FPGAs and ASICs, it is possible to provide parts of the described method directly in the hardware.

The present invention thus discloses a method for constructing an optimal time-controlled channel in a large computer network, such as the Internet, along an existing virtual connection, said channel enabling the conflict-free conveyance and immediate forwarding of the a priori scheduled time-controlled messages.

CITED LITERATURE

[1] U.S. Pat. No. 7,839,868. Kopetz, H. Communication method and system for the transmission of time-driven and event-*driven Ethernet messages*. Granted Nov. 23, 2010.

[2] US 20100220744, Ungerman, J., Intelligent Star Coupler for time-triggered communication protocol and method for communicating between nodes with a network using a time triggered protocol. Publication Date Sep. 2, 2010.

[3] US 20060242252, Jiang, S., Extensible Scheduling of Messages on Time-Triggered Busses. Publication Date Oct. 26, 2006.

[4] US 20110066854; Poledna, S., Method for Secure Dynamic Bandwidth Allocation in TT Ethernet. Publication Date Mar. 17, 2011

[5] US 20110032833 Zhang et al. Optimizing of Traffic Routing for Data Center Services. Publication Date Feb. 10, 2011

[6] Austrian patent application A 474/2012 by the company FTS Computertechnik of 19. 4. 2012 Selbstorganisierendes Verfahren zum Aufbau von deterministischen Routen in einem großen Computernetzwerk (Self-organising method for constructing deterministic routes in a large computer network).

[7] Kopetz, H. *Real-Time Systems, Design Principles for Distributed Embedded Applications*. Springer publishing house. 2011.

The invention claimed is:

1. A method for the dynamic creation of time-controlled (TT) paths in a large computer network consisting of a plurality of computer nodes, distribution modules and communication channels, wherein all distribution modules have access to a global time base, characterised in that a scheduling instance, which is aimed at establishing a time-controlled path with specified path time characteristics from a transmitting computer node (SRK) to a receiving computer node along an existing virtual connection, firstly, by means of a request message, requests from each distribution module arranged in the virtual connection all the TT path descriptor lists (TTPDLs) already confirmed by said distribution modules, then transmits the specified path time characteristics and all confirmed TTPDLs to a dynamic scheduler, and wherein the dynamic scheduler creates a new TTPDL for each distribution module arranged in the virtual connection, wherein the existing reserved TTPDLs of the distribution modules affected remain unchanged, and wherein the corresponding new TTPDLs are transmitted to each distribution module arranged in the virtual connection, wherein each distribution module arranged in the virtual connection reserves the TT path requested and confirms the successful reservation to the scheduling instance by means of a confirmation message, and wherein following the transient failure and restart of a distribution module during a specified reintegration interval, the distribution module does not perform a new reservation, and wherein all scheduling instances transmit, to the distribution modules affected, their confirmed active and passive reservations periodically with a period that is smaller than the reintegration interval.

2. The method according to claim 1, characterised in that a reservation of a TT path in a distribution module is performed for a future reservation interval with specified start point and end point.

3. The method according to claim 1 characterised in that a reservation of a TT path in a distribution module at a given moment in time can be active or passive, wherein a switchover from the passive to the active state and vice versa is triggered by an activation message to the distribution module affected.

4. The method according to claim 1, characterised in that following the request to a distribution module to transmit all confirmed TTPDLs to a scheduling instance, a reservation timeout is started in the distribution module, during which no further requests of this type may be handled.

5. The method according to claim 1, characterised in that the failure of a distribution module is identified by the absence of the alive messages to be transmitted periodically by the distribution module.

6. The method according to claim 1, characterised in that the construction of a time-controlled path is performed by the distribution module, which is directly connected to the SRK.

7. The method according to claim 1, characterised in that the communication between the scheduling instance and the distribution modules is secured by cryptographic methods.

8. A scheduling instance for use in a method according to claim 1.

9. The scheduling instance according to claim 8, characterised in that it is configured as a transmitting computer node, as a distinguished distribution module, as a system administrator or as another selected computer node, or characterised in that the function thereof is performed by the transmitting computer node, a distinguished distribution module, a system administrator or another selected computer node.

10. A scheduler for use in a method according to claim 1.

11. The scheduler according to claim 10, characterised in that the scheduler and a scheduling instance according to claim 1 are provided in common hardware.

12. The scheduler according to claim 10, characterised in that the scheduler is formed separately from a scheduling instance.

13. The scheduler according to claim 12, characterised in that the functions thereof are provided in a cloud of the computer network.

14. A computer network, in particular a large computer network consisting of a plurality of computer nodes, distribution modules and communication channels, wherein all distribution modules have access to a global time base, for carrying out a method according to claim 1.

* * * * *